Oct. 8, 1968
R. L. SPEERS
3,404,481
GOOSE AND DUCK DECOYS
Filed Sept. 17, 1965
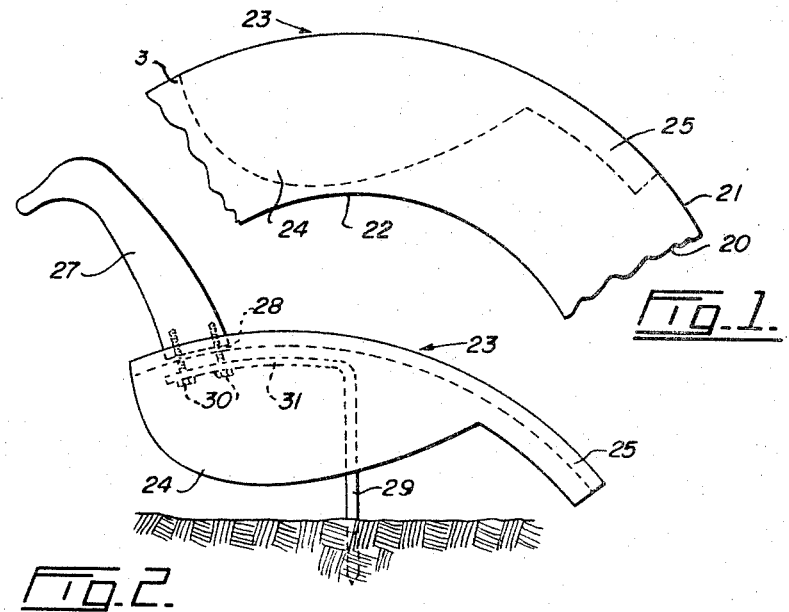
Fig. 1.
Fig. 2.
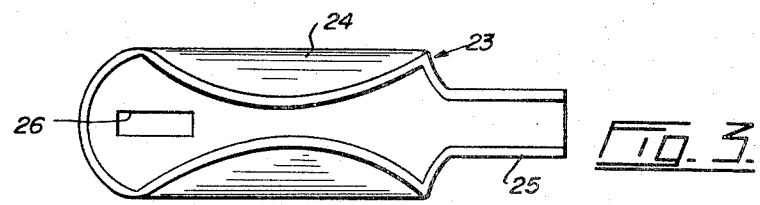
Fig. 3.
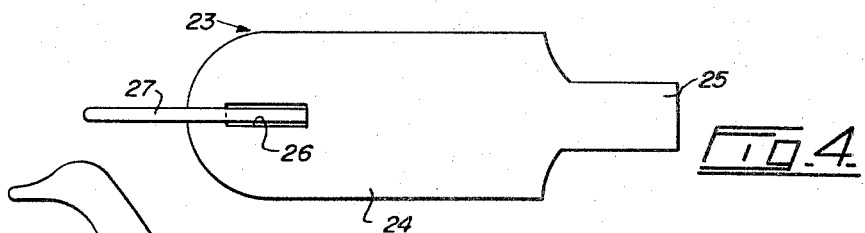
Fig. 4.
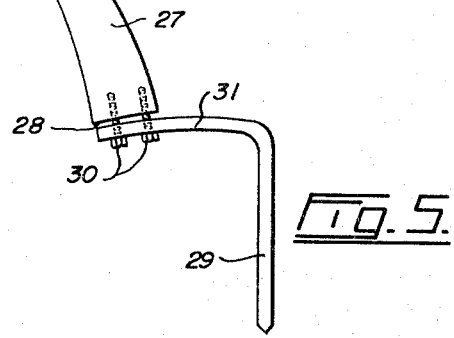
Fig. 5.
INVENTOR
ROBERT L. SPEERS
BY
Fisher, Christen, Sabel & Caldwell
ATTORNEYS

3,404,481
GOOSE AND DUCK DECOYS
Robert Lee Speers, 1604 Grant Drive,
Regina, Saskatchewan, Canada
Filed Sept. 17, 1965, Ser. No. 488,141
1 Claim. (Cl. 43—3)

ABSTRACT OF THE DISCLOSURE

A bird decoy comprises a back, tail and sides cut from an automobile tire and a combined head, neck and leg member protruding through the back and stuck in the ground. The leg member has an arm portion supporting the back of the decoy.

---

This invention relates to a bird decoy, particularly a goose or duck decoy, the body and tail portion of which is formed from a section of an automobile tire.

It is an object of this invention to provide bird decoys at a minimum cost to the trade by cutting the shape of the bird's bodies out of new or used automobile tires. This has the great advantage of making it possible to use very inexpensive material for the largest part of the decoys, thus keeping their cost to a minimum.

The bird decoy according to my invention has a body and tail portion which is cut from an automobile tire such that the tread portion of the tire forms the back and tail of the bird and the side-walls of the tire form the sides of the bird. A member in the shape of the head and neck of a bird extends upwardly from the tread portion adjacent the end thereof remote from the end forming the tail of the bird. A leg member is also attached to support the decoy.

According to a preferred embodiment, a slot is provided in the tread portion, which slot receives the head and neck member. The portion of the head and neck member which passes through the slot into the interior of the decoy is fastened to a leg member which consists of two parts at approximately a right angle to each other. The first part of the leg member is connected to the head and neck member and also supports a portion of the back of the decoy body while the second part of the leg member is adapted to project into the ground to retain the decoy in upright position.

My invention will now be illustrated by reference to the attached drawings in which:

FIGURE 1 is a fragmentary view of an automobile tire;

FIGURE 2 is a side elevation of an assembled goose decoy positioned for use on the ground;

FIGURE 3 is a bottom plan view of the body part shown in FIGURE 2;

FIGURE 4 is a top plan view of the assembled decoy, and

FIGURE 5 is a side elevation showing details of the leg and neck connection shown in FIGURE 2.

As shown in FIGURE 1, the body and tail portion 23 is obtained from an automobile tire 20 by cutting along the line 3. The cut is made such that the tread portion 21 of tire 20 forms the top of the body and tail portion 23 while the cut curves downwardly toward the bead 22 of tire 20 to form the body portion 24 of the decoy. The tail portion 25 is formed by continuing the cut in the same direction as the tread portion 21.

A slot 26 is cut out of the tread portion as shown in FIGURE 3 and the body and tail portion 23 can also be buffed with a conventional tire buffer to dull the surface and eliminate reflections from the sun.

The head and neck portion 27 can be formed from any suitable material and can, for example, be shaped from wood or moulded from plastic. The base 28 of head and neck portion 27 is fastened to a support leg 29 by means of screws 30. Support leg 29 includes a curved portion 31 which supports the curved back of the body portion 24 as shown in FIGURE 2.

It will be evident that the body and tail portions of FIGURE 3 and the neck and leg assemblies of FIGURE 5 can be stored separately to save space and then assembled immediately prior to use. To assemble the decoy, the neck and head portion 27 is passed through slot 26 of body and tail portion 23 such that the back of body portion 24 rests on portion 31 of leg 29. The decoy is then placed in position by pushing the leg 29 into the ground.

It will be understood, of course, that modifications may be made in the preferred embodiment of the invention without in any way departing from the spirit and scope of the invention as defined in the foregoing specification and appended claim.

I claim:
1. A bird decoy comprising: a body and tail portion formed from an automobile tire such that the tread portion of the tire forms a longitudinally curved back and an extending tail of the bird and the sidewalls of the tire form the sides of the bird; a member in the shape of the head and neck of a bird passing through a slot in said tread portion adjacent the end thereof remote from the end forming the tail of the bird and extending upwardly from said tread portion; and a leg member for supporting the decoy attached to said head and neck member, said leg member consisting of two parts of substantial length at approximately a right angle to each other, one of said parts of the leg member being connected to said head and neck member and having a curvature corresponding at least in part to the curvature of said back for supporting a portion of the back of the decoy body while the other of said parts of the leg member is adapted to project into the ground to retain the decoy in upright position.

References Cited
UNITED STATES PATENTS
3,029,541    4/1962    Palmer _____ 43—3

OTHER REFERENCES
Field and Stream magazine, November 1960, p. 70, Photocopy in 43/3.

WARNER H. CAMP, *Primary Examiner.*